(12) United States Patent
Kim et al.

(10) Patent No.: US 11,363,548 B2
(45) Date of Patent: Jun. 14, 2022

(54) METHOD AND DEVICE FOR CONFIGURING SYNCHRONIZATION SIGNAL FOR NEW RADIO ACCESS TECHNOLOGY

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 12 days.

(21) Appl. No.: 16/338,433

(22) PCT Filed: Sep. 28, 2017

(86) PCT No.: PCT/KR2017/010811
§ 371 (c)(1),
(2) Date: Mar. 29, 2019

(87) PCT Pub. No.: WO2018/062893
PCT Pub. Date: Apr. 5, 2018

(65) Prior Publication Data
US 2019/0239175 A1    Aug. 1, 2019

(30) Foreign Application Priority Data

Sep. 30, 2016 (KR) .................. 10-2016-0127093
Sep. 26, 2017 (KR) .................. 10-2017-0124195

(51) Int. Cl.
*H04W 56/00* (2009.01)
*H04J 11/00* (2006.01)

(52) U.S. Cl.
CPC ............ *H04W 56/001* (2013.01); *H04J 11/00* (2013.01); *H04J 11/0073* (2013.01); *H04J 11/0076* (2013.01); *H04J 11/0079* (2013.01)

(58) Field of Classification Search
None
See application file for complete search history.

(56) References Cited

U.S. PATENT DOCUMENTS

| | | |
|---|---|---|
| 2009/0279476 A1 | 11/2009 | Li et al. |
| 2010/0035611 A1 | 2/2010 | Montojo et al. |
| 2010/0103906 A1 | 4/2010 | Montojo et al. |
| 2010/0271965 A1 | 10/2010 | Siomina et al. |

(Continued)

FOREIGN PATENT DOCUMENTS

| | | |
|---|---|---|
| CN | 104812053 A | 7/2015 |
| WO | 2018/169963 A1 | 9/2018 |

OTHER PUBLICATIONS

Samsung, "Discussion on sync. signal considering forward compatibility aspects", R1-166744, 3GPP TSG RAN WG1 #86, Gothenburg, Sweden, Aug. 22-26, 2016, pp. 1-4.

(Continued)

*Primary Examiner* — Saba Tsegaye
(74) *Attorney, Agent, or Firm* — Invenstone Patent, LLC

(57) ABSTRACT

Provided are a method and a device for configuring and transmitting a synchronization signal in an NR system. The method includes configuring one or more synchronization signals to be transmitted within an entire bandwidth, and transmitting the configured one or more synchronization signals through the entire bandwidth.

12 Claims, 15 Drawing Sheets

(56) References Cited

U.S. PATENT DOCUMENTS

| | | |
|---|---|---|
| 2011/0235590 A1 | 9/2011 | Li et al. |
| 2013/0003585 A1 | 1/2013 | Siomina et al. |
| 2013/0322363 A1 | 12/2013 | Chen et al. |
| 2014/0003403 A1 | 1/2014 | Li et al. |
| 2014/0321259 A1 | 10/2014 | Siomina et al. |
| 2014/0364117 A1 | 12/2014 | Montojo et al. |
| 2015/0296467 A1* | 10/2015 | Kim ............. H04W 76/27 370/330 |
| 2016/0128014 A1 | 5/2016 | Xiaoding et al. |
| 2017/0033906 A1 | 2/2017 | Siomina et al. |
| 2017/0353279 A1 | 12/2017 | Siomina et al. |
| 2018/0014244 A1 | 1/2018 | Montojo et al. |
| 2018/0054788 A1* | 2/2018 | Kwon ............. H04J 11/0073 |
| 2018/0091249 A1* | 3/2018 | Han ............. H04J 11/0076 |
| 2018/0092064 A1* | 3/2018 | Ryu ............. H04L 27/2613 |
| 2018/0249400 A1* | 8/2018 | Harada ............. H04J 11/0079 |
| 2018/0262900 A1* | 9/2018 | Moon ............. H04J 11/0076 |
| 2018/0270771 A1 | 9/2018 | Chendamarai Kannan et al. |
| 2018/0324734 A1 | 11/2018 | Li et al. |
| 2019/0208481 A1* | 7/2019 | Tang ............. H04W 56/0015 |
| 2019/0357239 A1* | 11/2019 | Moon ............. H04L 1/1642 |

OTHER PUBLICATIONS

State Intellectual Property Office of People's Republic of China, Office Action of corresponding CN Patent Application No. 201780061059.3, dated Mar. 27, 2020.

European Patent Office, European Search Report of corresponding EP Patent Application No. 17856779.8, dated May 6, 2020.

Huawei et al., "A common synchronization signal for a NR carrier supporting different numerologies", R1-167217, 3GPP TSG RAN WG1 Meeting #86, Gothenburg, Sweden, Aug. 22-26, 2016, pp. 1-7.

LG Electronics, "Discussion on DL Synchronization in NR", R1-166910, 3GPP TSG RAN WG1 Meeting #86, Gothenburg, Sweden Aug. 22-26, 2016, pp. 1-6.

Inter Corporation, "Design on NR DL Synchronization", R1-167705, 3GPP TSG RAN WG1 Meeting #86, Gothenburg, Sweden, Aug. 22-26, 2016, pp. 1-7.

* cited by examiner

METHOD AND DEVICE FOR CONFIGURING SYNCHRONIZATION SIGNAL FOR NEW RADIO ACCESS TECHNOLOGY

CROSS REFERENCE TO RELATED APPLICATIONS

This application is a National Stage Patent Application of PCT International Patent Application No. PCT/KR2017/010811 (filed on Sep. 28, 2017) under 35 U.S.C. § 371, which claims priority to Korean Patent Application Nos. 10-2016-0127093 (filed on Sep. 30, 2016) and 10-2017-0124195 (filed on Sep. 26, 2017), the teachings of which are incorporated herein in their entireties by reference.

TECHNICAL FIELD

The present disclosure relates to methods and apparatuses for configuring and transmitting a new synchronization signal for new wireless communication systems.

BACKGROUND ART

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR).

It is required to design the NR not only to provide an improved data transmission rate as compared with the long term evolution (LTE)/LTE-Advanced, but also to meet various requirements required in detailed and specific usage scenarios.

For example, enhanced mobile broadband (eMBB), massive machine type communication (mMTC), and ultra reliable and low latency communication (URLLC) are proposed as representative usage scenarios of the NR. In order to meet the requirements of the individual scenarios, it is required to design the NR as flexible frame structures, compared with the LTE/LTE-Advanced.

Since each usage scenario imposes different requirements for data rates, latency, coverage, etc., there is a growing need for techniques of efficiently multiplexing radio resource units based on numerologies (e.g., a subcarrier spacing (SCS), a subframe, a transmission time interval (TTI), etc.) different from one another, in order to efficiently satisfy requirements for each usage scenario.

Meanwhile, a cell search procedure is required for a user equipment to access a cell in a wireless communication system. The cell search procedure includes a synchronization process containing a series of actions for enabling a user equipment to determine the time/frequency parameters. Through the synchronization process, the user equipment is enabled to demodulate a downlink signal and transmit an uplink signal at a proper time.

The cell search procedure of the typical LTE/LTE-Advanced system includes an initial synchronization and a new cell identification. In addition, in a prior phase of the cell search procedure, the user equipment can detect a such a synchronization signal transmitted from a base station.

Such a cell search procedure and synchronization signal detection are necessarily required for the user equipment to connect to a wireless communication system. Since the NR is designed with a flexible frame structure compared to the LTE/LTE-Advanced system, required is a new technique capable of configuring and transmitting a synchronization signal in order to perform a cell search procedure and synchronization signal detection for an NR system.

DETAILED DESCRIPTION OF THE INVENTION

Technical Problem

One object of the present disclosure is to provide a method of configuring and transmitting a synchronization signal in an NR system, and a technique for configuring and transmitting a synchronization signal in a flexible frame structure of the NR system.

Technical Solution

In accordance with an aspect of the present disclosure, a method is provided for configuring a synchronization signal for a new radio access technology. The method includes configuring one or more synchronization signals to be transmitted within an entire bandwidth, and transmitting the configured one or more synchronization signals through the entire bandwidth.

In accordance with another aspect of the present disclosure, a method is provided for configuring a synchronization signal for a new radio access technology. The method includes receiving one or more synchronization signals within an entire bandwidth, and performing time and frequency synchronization using the received one or more synchronization signals.

In accordance with another aspect of the present disclosure, provided is a base station including a controller configured to configure one or more synchronization signals to be transmitted within an entire bandwidth, and a transmitter configured to transmitting the configured one or more synchronization signals through the entire bandwidth.

In accordance with another aspect of the present disclosure, provided is a user equipment including a receiver configured to receive one or more synchronization signals transmitted within an entire bandwidth, and a controller configured to perform time and frequency synchronization using the received one or more synchronization signals.

Effects of the Invention

In accordance with at least one embodiment of the present disclosure, it is possible to configure and transmit one or more new synchronization signals suitable for a frame structure of the NR system. Through this, it is possible to support the performance improvement of the synchronization signal(s) and efficient synchronization acquisition of the user equipment.

BEST MODE FOR CARRYING OUT THE INVENTION

Figure 1:
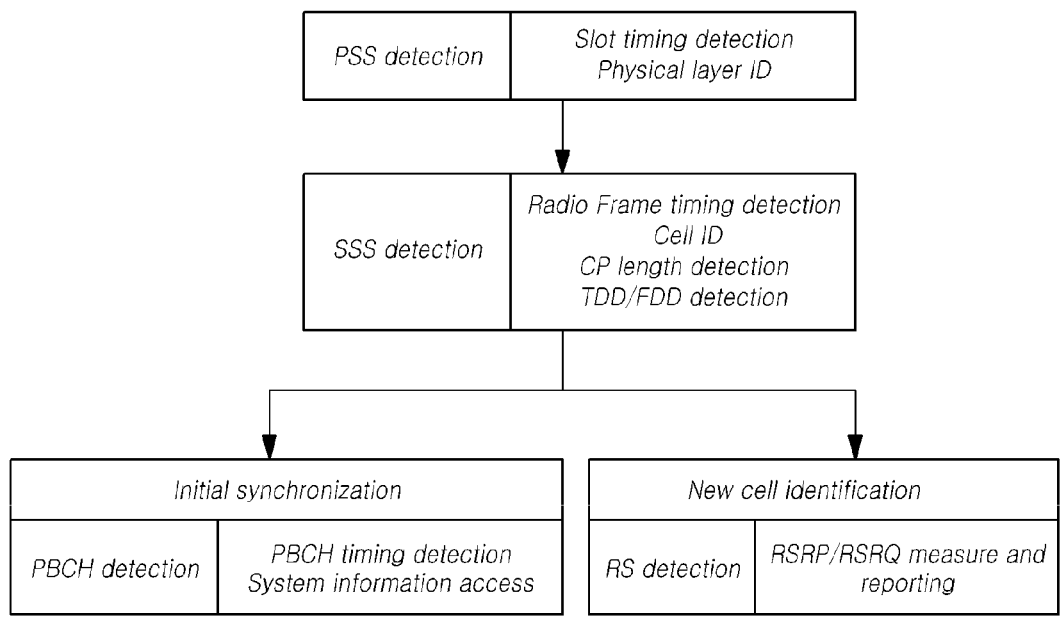
FIG. 1 is a diagram illustrating information obtained at each step of a cell search procedure for connecting to a wireless communication system.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

A base station or a cell generally refers to a station communicating with a user equipment. The base station or cell is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The various cells described above is controlled by a base station, therefore the base station may be classified into two categories. 1) The base station may be referred to an apparatus that provides a megacell, a macrocell, a microcell, a picocell, a femtocell, and a small cell, in association with a radio area, or 2) the base station may be referred to a radio area itself The former base station may be referred to all apparatuses providing any radio area, which are controlled by the same entity, or which interact to configure the radio area in cooperation with one another. According to methods of establishing a radio area, an example of the base station may be a point, a transmission/reception point, a transmission point, a reception point, or the like. The latter base station may be a radio area itself for enabling a user equipment to receive signals from or transmit signals to the other user equipment or a neighboring base station.

In the present disclosure, the cell may refer to a coverage of a signal transmitted from a transmission/reception point, a component carrier having the coverage of a signal transmitted from a transmission point or a transmission/reception point, or a transmission/reception point itself.

The user equipment and the base station of the present disclosure are two entities for performing transmission/reception used to embody the technology and technical spirit described in the present specification. The UE and the BS are defined as a generic term and not limited to specific terms or words.

The uplink (UL) refers to data transmission/reception from a user equipment to a base station, and the downlink (DL) refers to data transmission/reception from a base station to a user equipment.

UL transmission and DL transmission may be performed by utilizing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, in the wireless communication system, a standard is specified by configuring the UL and the DL based on a single carrier or a pair of carriers.

The UL and the DL transmit control information through one or more control channels, such as a physical DL control channel (PDCCH), a physical UL control channel (PUCCH), and the like, and transmit data through one or more data channels, such as a physical DL shared channel (PDSCH), a physical UL shared channel (PUSCH), and the like.

The DL may denote communication or a communication path from multiple transmission/reception points to a user equipment, and the UL may denote communication or a communication path from the user equipment to the multiple transmission/reception points. In the DL, a transmitter may be a part of multiple transmission/reception points, and a receiver may be a part of a user equipment. In the UL, a transmitter may be a part of a user equipment and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling described below includes radio resource control (RRC) signaling transmitting RRC information containing an RRC parameter.

The base station performs DL transmission to user equipments. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel will be described in such a manner that a corresponding channel is transmitted/received.

Any of multiple access techniques may be applied to the wireless communication system, and therefore no limitation is imposed on them. The wireless communication system may use various multiple access techniques including time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

At least one embodiment of the present disclosure may apply to resource allocation in i) asynchronous wireless communication evolving into LTE/LTE-advanced and IMT-2020 from GSM, WCDMA, and HSPA, and i) synchronous wireless communication evolving into CDMA, CDMA-2000, and UMB.

A machine type communication (MTC) terminal of the present disclosure may refer to a terminal supporting low costs (or low complexity), a terminal supporting coverage enhancement, or the like. As another example, the MTC terminal of the present disclosure may refer to a terminal defined as a predetermined category for supporting low cost (or low complexity) and/or coverage enhancement.

In other words, in the present disclosure, the MTC terminal may refer to a low cost (or low complexity) user equipment (UE) category/type newly defined in 3GPP Release-13 and performing LTE-based MTC-related operations. In the present disclosure, the MTC terminal may refer to a UE category/type defined in or before 3GPP Release-12, which supports enhanced coverage in comparison with the typical LTE coverage or supports low power consumption, or may refer to a low cost (or low complexity) UE category/type newly defined in Release-13. The MTC terminal may refer to a further enhanced MTC terminal defined in Release-14.

A narrowband Internet of Things (NB-IoT) terminal of the present disclosure refers to a terminal supporting radio access for cellular IoT. NB-IoT technology aims for improving indoor coverage, supporting for large-scale low-speed terminals, low latency sensitivity, very low terminal costs, low power consumption, and optimizing a network architecture.

An enhanced mobile broadband (eMBB), massive machine-type communication (mMTC), and ultra reliable and low latency communication (URLLC) are proposed as representative usage scenarios for NR on which discussions are in progress in the 3GPP.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

[Legacy synchronization: PSS/SSS]

FIG. 1 is a diagram illustrating information obtained at each step of a cell search procedure for connecting to a wireless communication system.

Referring to FIG. 1, a UE is required to perform a cell search procedure in order to attach to an LTE/LTE-Advanced cell. The cell search procedure includes a synchronization process containing a series of actions for enabling the UE to determine the time/frequency parameters. Through the synchronization process, the UE may be enabled to demodulate a DL signal and transmit an UL signal at a proper time.

The cell search procedure of the typical LTE/LTE-Advanced system includes an initial synchronization and a new cell identification.

The initial synchronization is to decode all information required in order for a UE to detect an LTE/LTE-Advanced cell first and then camp on that cell. It is performed when the UE is powered on or disconnected from a serving cell.

The new cell identification is performed in the process of detecting a new neighboring cell by the UE in a state where the UE has been attached to the LTE/LTE-Advanced cell, and the UE reports measurements related to the new cell to perform handover to a serving cell.

An eNB in each or every cell transmits Initial synchronization: its two physical channels, namely, a primary synchronization signal (PSS) and a secondary synchronization signal (SSS), and the UE detects the PSS and the SSS prior to the cell search procedure (the initial synchronization, the new cell identification).

When the UE detects the PSS and SSS signals, the UE may be enabled to perform time and frequency synchronization, to identify a physical cell ID (PCID) and a cyclic prefix (CP) length, and to obtain information on which of the FDD and TDD techniques the corresponding cell uses.

* Initial synchronization: When a synchronization signal is detected, the UE may decode a physical broadcast channel (PBCH) and then obtain system information, such as DL system bandwidth, or the like, based on the detected result.

* New cell identification: The UE, without decoding the PBCH, measures the signal quality of a newly-detected cell based on reference signals (RS) and reports the measurements to a serving cell (The LTE/LTE-Advanced is designed to enable RSRP to be measured/received without decoding the PBCH.)

The synchronization signal is transmitted twice every a radio frame of 10 ms, and the PSS and the SSS have different structures depending on whether the UE is connected to an FDD cell or a TDD cell.

Figure 2:
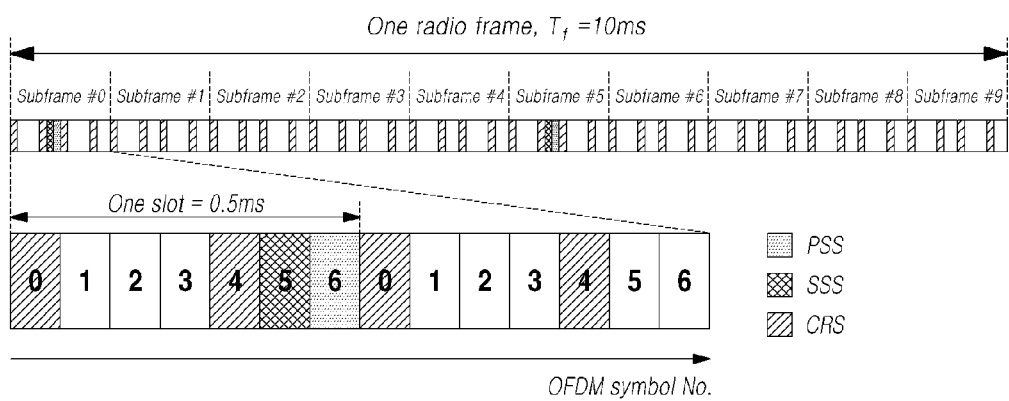
FIG. 2 is a diagram illustrating a frame structure of a primary synchronization signal (PSS) and a secondary synchronization signal (SSS) in frequency division duplex (FDD).
Figure 3:
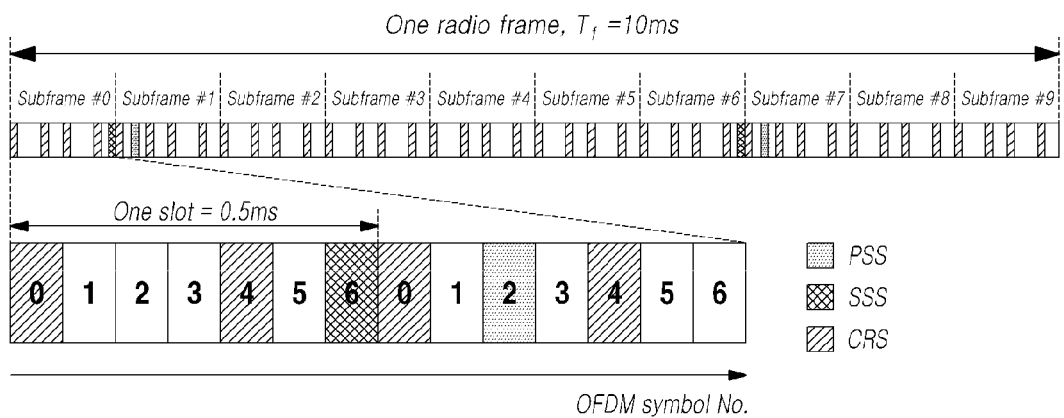
FIG. 3 is a diagram illustrating a frame structure of the primary synchronization signal (PSS) and the secondary synchronization signal (SSS) in time division duplex (TDD).

FIG. 2 shows a frame structure of the PSS and the SSS in FDD, and FIG. 3 shows a frame structure of the PSS and the SSS in TDD.

Referring to FIGS. 2 and 3, in an FDD cell, the PSS is located in the last OFDM symbol of a first slot and in the last OFDM symbol of an eleventh symbol in a radio frame of 10 ms. Each slot is made up of 6 or 7 OFDM symbols according to the length of a cyclic prefix (CP). Since the PSS is located in the last symbol of the slot, the UE can obtain information on a slot boundary timing regardless of the length of the CP.

The SSS is located in a symbol prior to the PSS, and assuming that radio channel characteristics are constant over a longer time than the length of the OFDM symbol, it is possible to coherently detect the SSS based on the PSS.

In a TDD cell, the PSS is located in a third OFDM symbol of a third slot and in a third OFDM symbol of a thirteenth slot, and the SSS is located prior to three OFDM symbols relative to the PSS. In this case, assuming that a coherence time of a channel is sufficiently longer than four OFDM symbols, it is possible to coherently detect the SSS.

The precise location of the SSS is changed according to the length of a CP selected in a corresponding cell. Since the UE does not know the length of the CP in advance when the cell is detected, the UE may be enabled to identify and detect two possible SSS locations for each of a normal CP and an extended CP. When searching all of FDD and TDD cells, it is necessary for the UE to check a total of four possible SSS locations.

The PSS in a specific cell is the same in all frames, while sequences of two SSSs in each radio frame are different from each other. Accordingly, the UE can recognize the radio frame boundary of 10 ms using information on the SSS.

Figure 4:
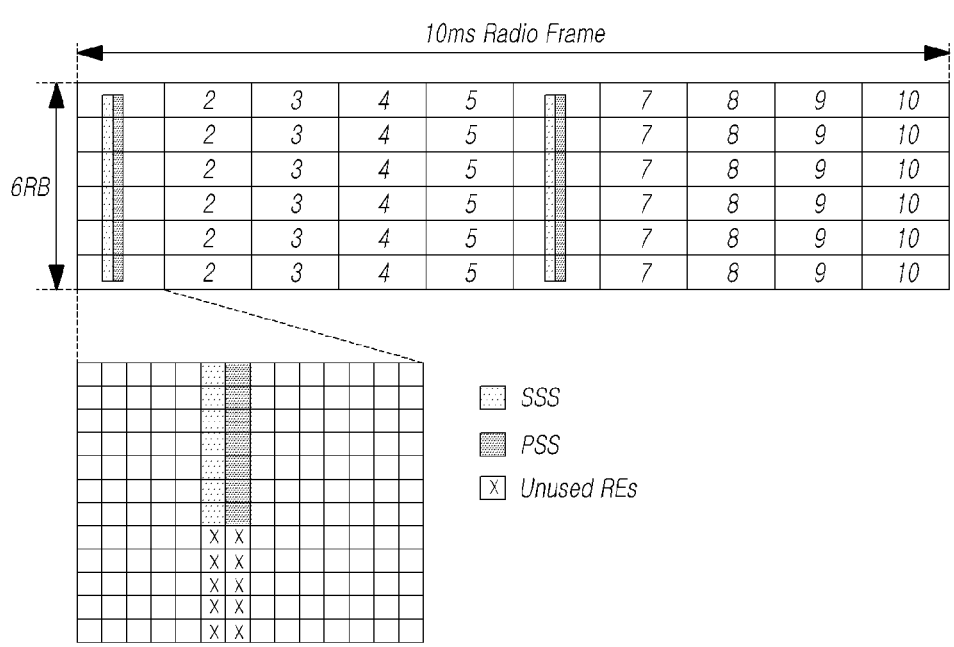
FIG. 4 is a diagram illustrating a frame structure of the primary synchronization signal (PSS) and the secondary synchronization signal (SSS) in a frequency-time domain in an FDD cell.

FIG. 4 shows is frame structures of the PSS and the SSS in the frequency-time domain of an FDD cell.

Referring to FIG. 4, the PSS and the SSS are mapped to subcarriers of center 6 resource blocks (RB) in the frequency domain.

The number of RBs ranges from 6 to 110 according to system bandwidths. Since the PSS and the SSS are mapped to center 6 RBs, the UE may detect the PSS and the SSS in the same method, regardless of a bandwidth of a signal from the eNB. Since each of the PSS and the SSS are sequences made up of 62 symbols, it is mapped to center 62 subcarriers located around a DC subcarrier, and the DC subcarrier is not used.

Accordingly, all resource elements (RE) in center 4 RBs among 6 RBs are used, while 7 REs in 2 RBs located on the sides are used and 5 REs are not used. The UE uses a fast Fourier transform (FFT) with the size of 64 to detect the PSS and the SSS, in which a sampling rate is lower compared with a case where 72 subcarriers are used.

The UE may obtain a physical layer cell ID using specific sequences of the PSS and the SSS. The LTE/LTE-Advanced has a total of 504 unique physical layer cell IDs divided into 168 groups, and each group includes three cell Ids, which are allocated to a cell controlled by an identical eNB. Each group is identified by an SSS sequence, and therefore a total of 168 SSS sequences are required to identify each group.

The PSS uses a Zadoff-Chu (ZC) sequence. The ZC sequence is used in a random access preamble and an uplink reference signal, in addition to the PSS.

Three ZC PSSs corresponding to three physical layer IDs of each cell group are used in the LTE/LTE-advanced.

Figure 5:
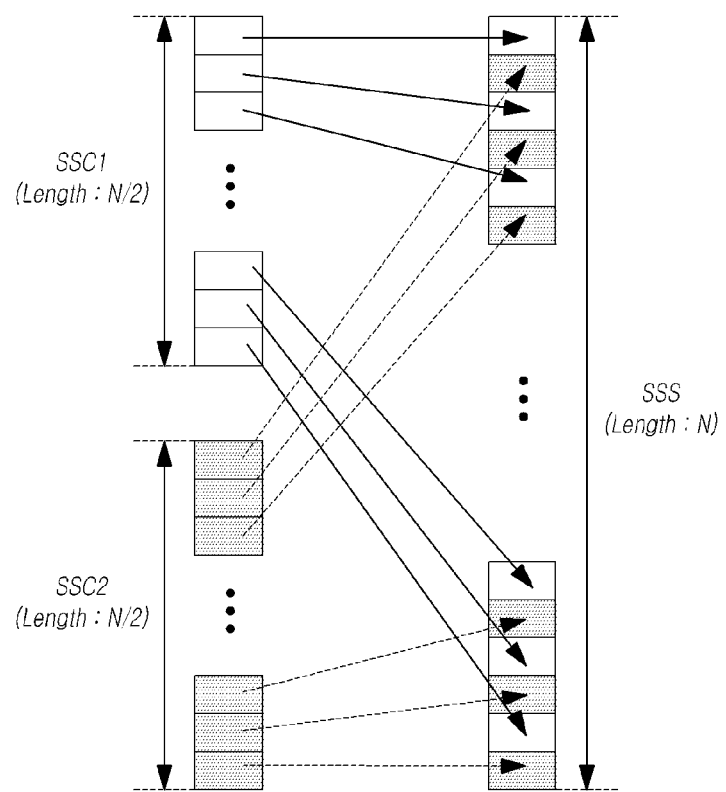
FIG. 5 is a diagram illustrating sequence mapping for the secondary synchronization signal.

FIG. 5 shows SSS sequence mapping.

Referring to FIG. 5, the SSS is configured based on an M-sequence that is a sequence generated by an n shift registers and having the length of 2n−1. Each SSS sequence is generated by i) generating two BPSK modulated synchronization codes (SSC1 and SSC2) each having the length of 31 in the frequency domain, and ii) alternately inserting the two BPSK modulated synchronization codes (SSC1 and SSC2) by an interleaving scheme. The two codes for generating the SSC1 and the SSC2 may be generated by differently cyclic shifting a M-sequence with the length of 31.

In this case, a cyclic shift index is determined by a function of a physical layer cell ID group. The SSC2 is scrambled by a sequence determined by a function of an index of the SSC1, and scrambled once more by a code determined by a function of the PSS.

[5G NR (New Radio)]

Recently, the 3GPP has approved the "Study on New Radio Access Technology", which is a study item for research on next-generation/5G radio access technology. On the basis of the Study on New Radio Access Technology, Radio Access Network Working Group 1 has been discussing frame structures, channel coding and modulation, waveforms, multiple access methods, and the like for the new radio (NR).

It is required to design the NR to improve a data transmission rate as compared with the LTE/LTE-Advanced and to meet various requirements required in detailed and specific usage scenarios.

In particular, enhanced mobile broadband (eMBB), massive machine type communication (mMTC), and ultra reliable and low latency communication (URLLC) are proposed as representative usage scenarios of the NR. In order to meet the requirements of the individual scenarios, it is required to design the NR as flexible frame structures, compared with the LTE/LTE-Advanced.

Specifically, the eMBB, mMTC, URLLC are considered as representative usage scenarios of the NR having been discussed in the 3GPP. Since each usage scenario imposes different requirements for data rates, latency, coverage, etc., there is a growing need for techniques of efficiently multiplexing radio resource units based on numerologies (e.g., a subcarrier spacing (SCS), a subframe, a transmission time interval (TTI), etc.) different from one another, as a method for efficiently satisfying requirements for each usage scenario through a frequency band established in an NR system.

For example, likewise the typical LTE/LTE-Advanced, there is a growing need for supporting through one NR frequency band a 1 ms subframe (or a 0.5 ms slot) structure based on a 15 kHz subcarrier spacing, a 0.5 ms subframe (or a 0.25 ms slot) structure based on a 30 kHz subcarrier spacing, and a 0.25 ms subframe (or a 0.125 ms slot) structure based on a 60 kHz subcarrier spacing.

In addition, discussions are in progress for techniques of i) configuring either a subframe (e.g. X=14 or 7, or any other natural number) made up of X OFDM symbols or a symbol (e.g. Y=14 or 7, or any other natural number) made up of Y OFDM symbols as a resource allocation unit in the time domain, e.g., a scheduling unit in the time domain, in a numerology structure, e.g., a subcarrier spacing, or ii) defining a mini-slot made up of Z OFDM symbols (i.e. any natural number satisfying Z<Y & Z<X) having smaller granularity than the subframe or the slot.

Figure 6:
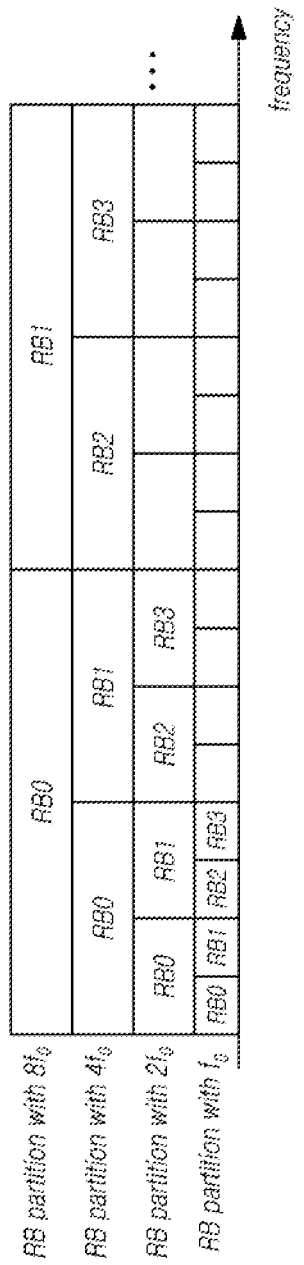
FIG. 6 illustrates a resource block structure in a TDM-based mixed numerology.

FIG. 6 is a diagram illustrating a resource block structure in a TDM-based mixed numerology.

As described above, a plurality of numerologies is supported through an NR carrier. For subcarrier spacing of $2^n*15$ kHz for each numerology, it is defined that subcarriers for each numerology are mapped on the subset/superset of those for subcarrier spacing of 15 kHz in a nested manner in the frequency domain.

In addition, in a case where a frame structure is configured by multiplexing corresponding numerologies in TDM manner, RBs serving as a resource allocation unit in the frequency axis through a corresponding NR carrier are defined as the subset/superset of the RB for the RB grid based on 15 kHz in a nested manner, as shown FIG. 6.

In this case, the number of subcarriers composing one RB in each numerology is determined to have one of 12 or 16 regardless of a corresponding numerology.

Meanwhile, there is no new synchronization signal design method suitable for an NR related frame structure. In some embodiments of the present disclosure, proposed are new synchronization signal design methods capable of supporting various numerologies of the NR.

Figure 7:
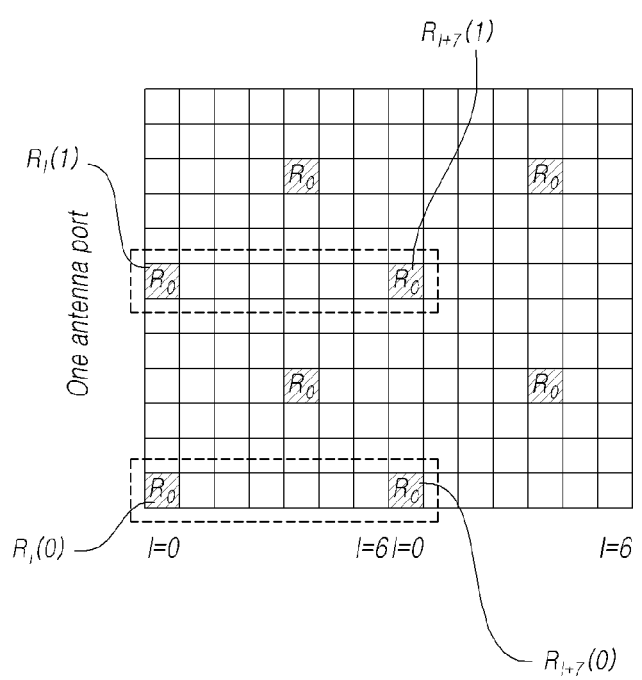
FIG. 7 is a conceptual diagram illustrating sequence correlation for deriving a frequency offset using CRS port 0.
Figure 8:
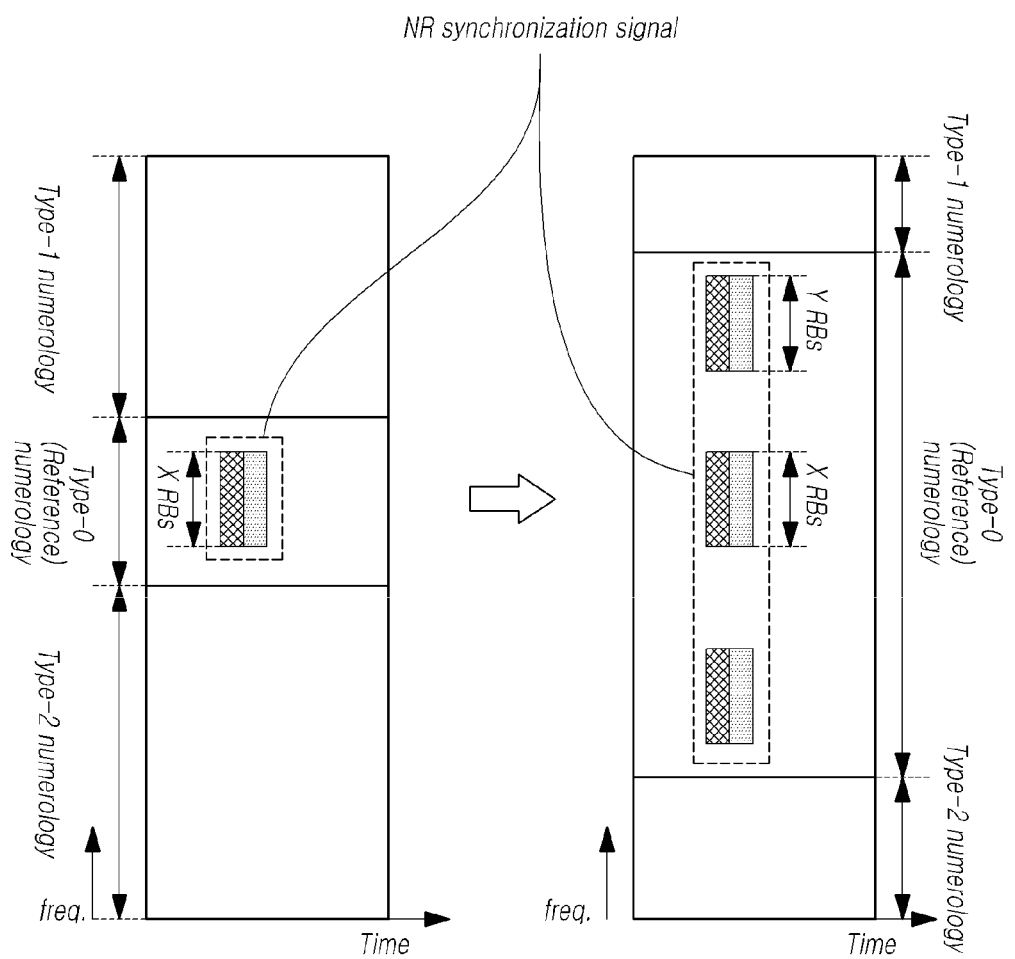
FIG. 8 is a diagram illustrating a concept of a synchronization signal being configurable in a reference numerology band (FDM case).

FIG. 7 is a conceptual diagram illustrating sequence correlation for deriving a frequency offset using CRS port 0.

The typical synchronization signal, e.g., the PSS/SSS of the LTE/LTE-Advanced is allocated to center 6 RBs and then transmitted.

Basically, it is possible for a UE to achieve synchronization by just detecting corresponding RBs.

However, such a method does not provide a specific synchronization function, such as an actual phase error. This function is left to an implementation area, and currently, a corresponding residual frequency offset (or phase error) is estimated using one or more ports of the CSR For example, when the number of entire sequences of CRS (Common Reference Signal) port 0 is NRs, correlation between corresponding mapped two reception sequences is expressed as follows.

$$C_l(j) = R_l^*(j) R_{l+D_s}(j)$$

$R_l(j)$ means the 'j'th reception signal received by the UE in the 'i'th symbol'.

Additionally, $D_s$ means the distance between two consecutive OFDM symbols.

$\rho$ means a normalized OFDM unit length in consideration of the length of the CP, and is represented as follows.

$$\rho = N_e/N$$

$$N_e = N + N_{CP}$$

Here, an equation for finally obtaining the frequency offset by the UE is given as follows.

$$\hat{\gamma} = \frac{1}{2\pi D_s \rho} \arg\left[\sum_{j=1}^{N_{RS}} C_l(j)\right]$$

Here, it has a range of $$|\gamma| \le \frac{N}{2N_e D_s}.$$

Using methods described above, the UE i) achieves synchronization by compensating an initial frequency offset based on the PSS/SSS of center 6 RBs, ii) obtains information on an entire transmission band through the PBCH, and then iii) estimates an additional frequency offset using the CRS port.

This may become a reference signal for precisely configuring synchronization to the entire frequency band, because the CRS is allocated to an entire frequency band and then transmitted, regardless of configuring a frequency band of the LTE/LTE-Advanced system. In addition, the CRS can provide more precise synchronization acquisition performance due to an RS density higher than that of other reference signals.

Similar to the legacy PSS/SSS, it is expected that the synchronization signal will be transmitted on some limited narrow bands in the NR, namely, the next generation radio access system. This is because it is possible to have a structure advantageous for supporting flexible numerology and reducing signal overhead. In the NR, it is actually considered to design a system that avoids great system losses such as the CRS.

In addition, in order to keep the complexity of each numerology to a minimum, a configurable synchronization structure can provide an advantage for the number of transmission periods.

Accordingly, the present disclosure proposes methods of designing a synchronization signal capable of more effectively supporting the frequency offset in the environment described above.

Embodiment 1. Allocate a Configurable
Synchronization Signal on an Additional Band
Except for a Synchronization Signal Transmission
Band of a Reference Numerology Band In Embodiment 1, a flexible band change of the same numerology is basically assumed.

In other words, basically, it is assumed that a synchronization signal is allocated to a specific narrowband. On the contrary, it is assumed that the size of the reference numerology band is changed depending on a specific configuration. Similarly, in the typical LTE/LTE-Advanced, a synchronization signal of the PSS/SSS is transmitted only on center 6 RBs, and the synchronization is supported by configuring the entire band, e.g., 6 RBs (1.4 MHz band), 15 RBs (3 MHz band), 25 RBs (5 MHz band), 50 RBs (10 MHz band), 75 RBs (15 MHz band) and 100 RBs (20 MHz band), as a single PSS/SSS. However, in order to achieve precise synchronization, the UE needs the assistance of the reference signal transmitted at the same position as the typical CRS at a predetermined time period. On the contrary, in the NR, assuming that such a structure is minimized, if a synchronization signal of the NR is also transmitted on center 'X' RBs, it is needed to achieve precise synchronization on the remaining bands.

Accordingly, in this Embodiment 1, provided is a structure for transmitting an additional synchronization signal for providing synchronization acquisition quality suitable for changing the size of a reference band in order for a UE to achieve precise synchronization. A synchronization signal transmitted on center 'X' RBs is used for achieving synchronization for initial access of a UE, and an additional synchronization signal allocated on the remaining bands enhances the quality of synchronization achievement.

The synchronization signal being additionally allocated and transmitted may be additionally configured (RRC signaling) by a gNB/eNB and include a transmitted period, a type of a synchronization signal, the number of transmissions, and the like. Basically, the synchronization signal being additionally transmitted is assumed to be 'Y' RBs, but if X=Y, the synchronization signal of the same length may be repeatedly transmitted. The proposed method may be applied regardless of whether multiple numerologies are based on TDM scheme, FDM scheme, or FDM/TDM scheme.

Embodiment 1-1 Allocate a Configurable
Synchronization Signal in an Additional Band
Except for an Initial Synchronization Signal
Transmission Location(s) in Numerology Band(s)
Other than a Reference Band As the same manner as Embodiment 1, in this Embodiment 1-1, an additional synchronization signal may be configured in the configurable manner to remaining numerology bands except for the reference numerology, if a band equal to or greater than a predetermined size is allocated.

Embodiment 1-2 Transmission Periods of the
Synchronization Signal(s) being Additionally
Transmitted Except for the Initial Synchronization
Signal Transmission Location(s) May be Different
from Each Other or from the Period of the
Synchronization Signal for Initial Access Basically, a synchronization signal of each numerology is transmitted based on a corresponding fixed location for initial access and its period is also constant. However, the periods of the synchronization signal(s) allocated additionally may be different from each other or from the period of the synchronization signal for initial access.

For example, if the synchronization signal for the initial access is transmitted in 'tx' period, the additional synchronization signal may be configured in 'N×tx' period and then transmitted. For example, if it is configured to have N=2, the additional synchronization signal is transmitted only once when the reference synchronization signal is transmitted twice.

Embodiment 1-3 A Transmission Location(s) or a Resource(s) (Time-Frequency) of the Synchronization Signal(s) being Additionally Transmitted Except for the Initial Synchronization Signal Transmission Location(s) May be Configured in a Period of a Predetermined Pattern Basically, a synchronization signal of each numerology is transmitted based on a corresponding fixed location for initial access. However, as in Embodiment 1-2, the additional synchronization signal(s) may be transmitted different from each other or from the period of the synchronization signal for initial access, and the transmitted location(s) also may have a predetermined pattern.

For example, it is possible to configure the synchronization signal(s) to be transmitted with a predetermined period through different resources on a predetermined band(s), as in frequency hopping.

Figure 9:
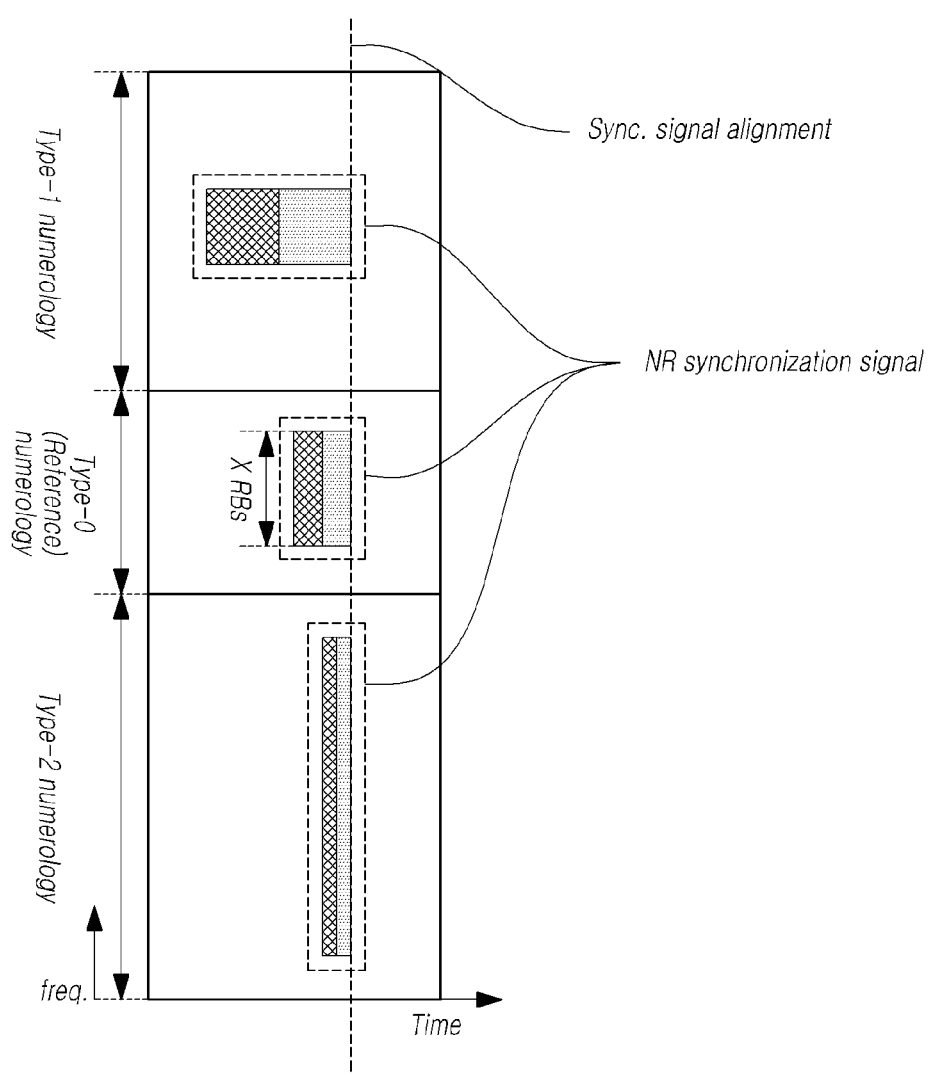
FIG. 9 is a diagram illustrating a concept of synchronization signal alignment using different numerologies (FDM case).

Embodiment 2. Align the Synchronization Signal on a Specific Location in the Case of FDM Based Multiple Numerology Multiplex Embodiment 2-1 Align on a Synchronization Signal Transmission Location of a Reference Numerology In accordance with this Embodiment 2-1, proposed is a method of aligning the synchronization signal when different numerologies are configured based on FDM, as illustrated in FIG. 9.

That is, when all synchronization signals are aligned on a specific location, it is easy to estimate a frequency offset using the corresponding synchronization signals. In other words, since the more simultaneously corresponding synchronization signals are received, the shorter coherence time is. Therefore, it is possible to obtain more precise samples of synchronization signals and achieve more precise synchronization using the corresponding values.

The synchronization signal(s) transmitted over each numerology may have the same length, but the size of occupied bands may be different according to the numerologies.

It is preferable to configure an aligned location of the synchronization signals to be located on the last symbol or the start symbol of the boundary of a subframe/symbol period/minislot/slot, etc. However, according to situations, if transmission points coincide or there is an aligned point, on an intermediate area of a subframe/symbol period/minislot/slot, these may be used as an aligned location of synchronization signals.

The same principle as the FDM cannot be applied to the following TDM method because transmitted periods of different numerologies are different depending on a configuration of the TDM-based numerology transmission period.

Considering this situation, in order to align locations of the synchronization signals, proposed is a method of transmitting synchronization signals with the same time interval. That is, although transmission time points of the synchronization signals for each numerology may be different, transmission periods of the synchronization signals may be configured on a certain multiple basis.

TABLE 1

Example of the alignment of TDM based synchronization signal transmission locations

| Numerology | Period | Difference in transmission time between a period for each numerology and a reference synchronization period |
|---|---|---|
| Type-0 (reference numerology) | X ms | — |
| Type-1 | X/2 ms | * ½ |
| Type-2 | 2X ms | * 2 |
| . . . | . . . | |

In the present disclosure, methods are provided for configuring and for transmitting a new synchronization signal for NR in the 3GPP LTE/LTE-Advanced systems. These methods improve the performance of the synchronization signal and enable the UE to achieve synchronization efficiently.

Figure 10:
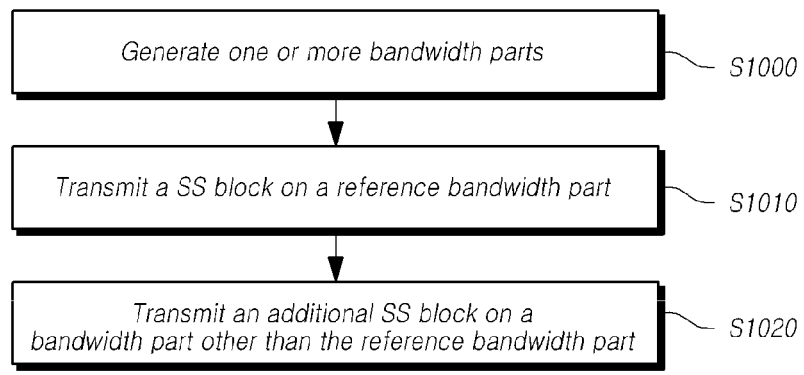
FIGS. 10 and 11 are flowcharts illustrating a method of configuring a synchronization signal for a new radio access technology according to at least one embodiment of the present disclosure.
Figure 11:
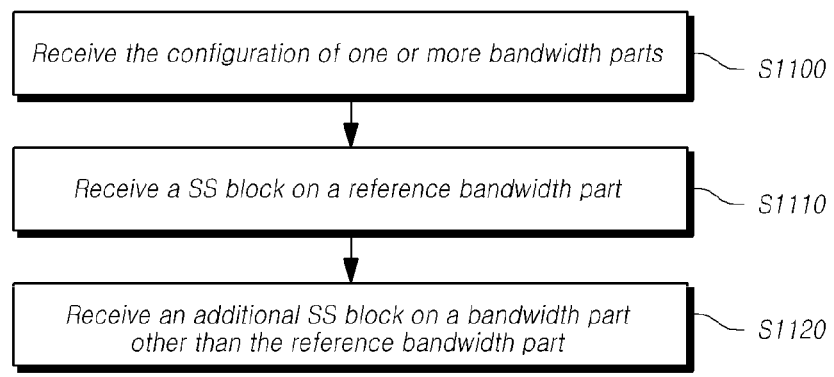

FIGS. 10 and 11 are flowcharts illustrating a method of configuring the synchronization signal for the new radio access technology according to at least one embodiment of the present disclosure.

Referring to FIG. 10, a base station may generate one or more bandwidth parts by dividing an entire bandwidth of a system into one or more parts (S1000).

That is, Type-0 numerology, Type-1 numerology, Type-2 numerology, etc. in the embodiments described above, may be bandwidth parts generated by dividing the entire system bandwidth.

The base station may signal configuration information on the generated one or more bandwidth parts to a UE semi-statically. For example, the base station may signal the configuration of the bandwidth part(s) to the UE through RRC signaling.

The base station may configure a synchronization signal or a synchronization signal block, to be transmitted through a first bandwidth part, which is a reference bandwidth part, among one or more bandwidth parts. Here, the first bandwidth part denotes a bandwidth part for necessarily transmitting a synchronization signal, among bandwidth parts generated by dividing the entire system bandwidth, and may denote the reference numerology, or Type-0 numerology, in the embodiment described above.

The base station transmits the configured synchronization signal in association with the first bandwidth part to the UE through the first bandwidth part (S1010).

The base station may configure a synchronization signal on a second bandwidth part other than the first bandwidth part. The bandwidth of the first bandwidth part and the second bandwidth part may be larger than that of a block for transmitting the synchronization signal.

In addition, the base station may not configure a synchronization signal in association with the second bandwidth part.

That is, the base station may generate one or more bandwidth parts by dividing the entire system bandwidth into one or more bandwidth parts and configure a configurable synchronization signal in association with the second bandwidth part other than the first bandwidth part for necessarily transmitting a synchronization signal.

In addition, the base station may configure a period of the synchronization signal configured on the first bandwidth part and a period of the synchronization signal configured on the second bandwidth part, which are different from each other.

In addition, the base station may configure an additional synchronization signal in association with a bandwidth other than a bandwidth for transmitting a synchronization signal configured in association with the first bandwidth part. That is, basically, when the bandwidth of the first bandwidth part for transmitting a synchronization signal is over a predetermined level, the base station may configure an additional synchronization signal, allowing the UE to detect the synchronization signal(s).

The base station transmits the synchronization signal configured for the second bandwidth part to the UE (S1020).

Accordingly, in accordance with at least one embodiment of the present disclosure, the base station in the NR system may basically additionally configure a configurable synchronization signal in association with a bandwidth part other than a bandwidth part for transmitting a synchronization signal is transmitted. In addition, basically, the base station may configure an additional synchronization signal in association with a band other than a band for transmitting a synchronization signal in a bandwidth part for transmitting the synchronization signal.

Thus, it is possible to configure a synchronization signal suitable for a flexible frame structure of the NR system and transmit the configured synchronization signal in accordance with at least one embodiment.

Referring to FIG. 11, a UE receives information on the configuration of one or more bandwidth parts from a base station (S1100).

The base station may generate one or more bandwidth parts by dividing an entire system bandwidth into one or more parts and allow the UE to recognize information on the configuration of one or more bandwidth parts by semi-statically signaling.

The UE receives a synchronization signal transmitted through a first bandwidth part among one or more bandwidth parts generated by the base station (S1110).

The first bandwidth part is basically a band for transmitting a synchronization signal. Therefore the UE may identify the first bandwidth part through the information on the configuration of the bandwidth part received from the base station and receive the synchronization signal through the first bandwidth part.

The UE may receive a synchronization signal transmitted through a second bandwidth part other than the first bandwidth part (S1120).

In addition, the UE may not receive the synchronization signal through the second bandwidth part.

That is, the UE basically receives a synchronization signal through the first bandwidth part for transmitting the synchronization signal and may receive or may not receive a synchronization signal through a second bandwidth part other than the first bandwidth part.

Accordingly, it is possible for the UE to obtain effectively a synchronization signal in a flexible frame structure as in the NR system in accordance with at least one embodiment.

In addition, in a wireless communication system according to at least one embodiment of the present disclosure, the base station and/or the UE may configure one or more synchronization signals in an entire bandwidth without dividing the entire bandwidth into one or more bandwidth parts and then transmit the configured synchronization signal(s).

Figure 12:
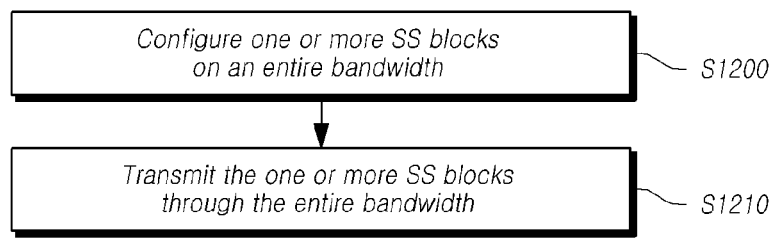
FIGS. 12 and 13 are flowcharts illustrating a method of configuring a synchronization signal for a new radio access technology according to another embodiment of the present disclosure.
Figure 13:
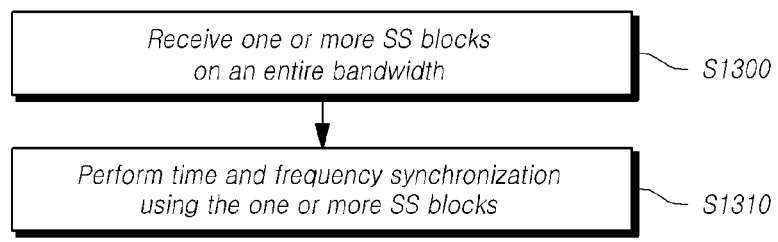

FIGS. 12 and 13 are flowcharts illustrating a method of configuring a synchronization signal for a new radio access technology according to another embodiment of the present disclosure.

Referring to FIG. 12, a base station may configure one or more synchronization signals to be transmitted within an entire system bandwidth (S1200).

That is, the base station may configure one or more synchronization signals to be transmitted within the entire system bandwidth and configure a plurality of synchronization signals for the entire bandwidth, regardless of dividing the entire bandwidth into one or more bandwidth parts.

The base station transmits the configured one or more synchronization signals to a UE through the entire bandwidth (S1210).

Accordingly, the base station may i) configure one or more synchronization signals within the entire bandwidth and transmit the configured synchronization signal(s), or ii) configure a synchronization signal for each bandwidth part obtained by dividing the entire bandwidth into one or more bandwidth parts.

Referring to FIG. 13, a UE may receive one or more synchronization signals configured for the entire bandwidth from a base station (S1300).

The UE may receive one or more synchronization signals configured through the entire bandwidth, e.g., a wideband.

The UE may perform time and frequency synchronization using one or more synchronization signals received from the base station through the entire bandwidth, and identify a cell ID, etc.

Accordingly, in accordance with at least one embodiment of the present disclosure, in a flexible frame structure of the new wireless communication systems, it is possible to transmit and receive i) one or more synchronization signals transmitted within the entire bandwidth, or ii) a synchronization signal configured for one or more bandwidth parts generated from dividing the entire bandwidth.

Figure 14:
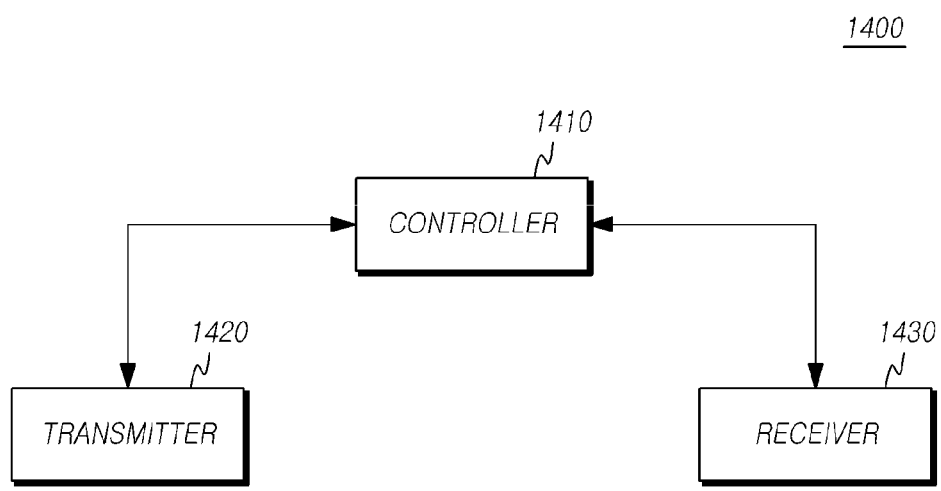
FIG. 14 is a block diagram illustrating a base station according to at least one embodiment of the present disclosure.

FIG. 14 is a block diagram illustrating a base station according to at least one embodiment of the present disclosure.

Referring to FIG. 14, a base station 1400 according to at least one embodiment of the present disclosure includes a controller 1410, a transmitter 1420, and a receiver 1430.

The controller 1410 is configured to control the overall operations of the base station 1400 for allocating a configurable synchronization signal on an additional band except for at least one initial synchronization signal transmission location in a band other than a reference band according to at least one embodiment of the present disclosure. In addition, the controller 1410 is configured to control the overall operations of the base station 1400 for configuring one or more synchronization signals to be transmitted in the entire bandwidth.

The transmitter 1420 and the receiver 1430 are used to transmit to and receive from a UE, signals, messages, and data necessary for carrying out the present disclosure described above.

Figure 15:
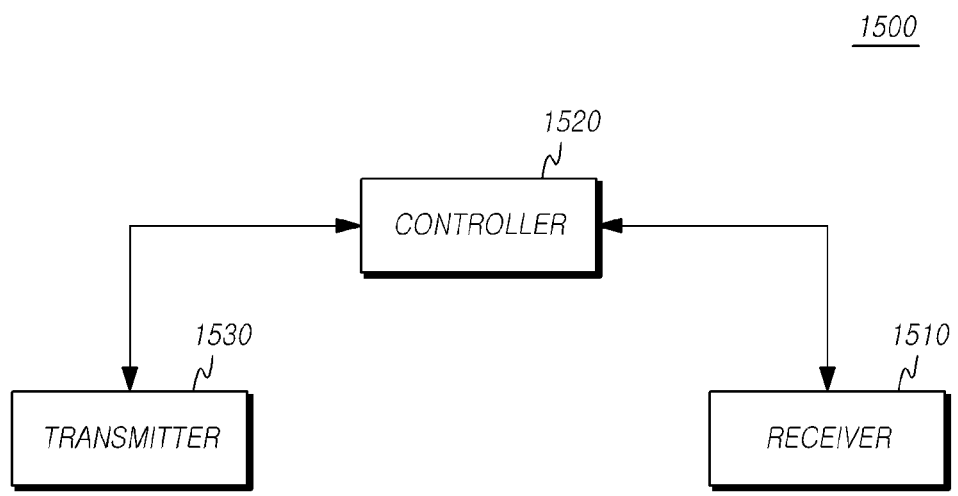
FIG. 15 is a block diagram illustrating a user equipment according to at least one embodiment of the present disclosure.

FIG. 15 is a block diagram illustrating a UE according to at least one embodiment of the present disclosure.

Referring to FIG. 15, a UE 1500 according to at least one embodiment of the present disclosure includes a receiver 1510, a controller 1520, and a transmitter 1530.

The receiver 1510 receives downlink control information and data, messages through a corresponding channel from a base station.

The controller 1520 is configured to control the overall operations of the UE 1500 for receiving a configurable synchronization signal on an additional band except for at least one initial synchronization signal transmission location in a band other than a reference band according to at least one embodiment of the present disclosure. In addition, the controller 1520 is configured to control the overall operations of the UE 1500 for receiving one or more synchronization signals transmitted in the entire bandwidth.

The transmitter 1530 transmits uplink control information and data, messages through a corresponding channel to a base station.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

APPENDIX

[1] Ericsson, Huawei, "New SI proposal Study on Latency reduction techniques for LTE", RP-150465, Shanghai, China, Mar. 9-12, 2015.
[2] R2-155008, "TR 36.881 v0.4.0 on Study on Latency reduction techniques for LTE", Ericsson (Rapporteur)
[3] R1-160927, "TR 36.881-v0.5.0 on Study on Latency reduction techniques for LTE", Ericsson (Rapporteur)

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of configuring a synchronization signal for a new radio (NR) access technology, the method comprising:
    generating a first bandwidth part (BWP) and a second BWP from a NR bandwidth for a user equipment (UE);
    configuring a first synchronization signal to be transmitted to the UE in association with the first BWP;
    transmitting, to the UE, the configured first synchronization signal through the first BWP; and
    configuring and transmitting, to the UE, a second synchronization signal in association with the second BWP,
    wherein an additional synchronization signal is configured and transmitted to the UE based on a bandwidth size of the first BWP.

2. The method according to claim 1, wherein the bandwidth of the first BWP and a bandwidth of the second BWP are equal to or greater than that of a block for transmitting the first or second synchronization signals.

3. The method according to claim 1, further comprising:
    transmitting, to the UE, configuration information on the first BWP and the second BWP through a radio resource control (RRC) signaling.

4. The method according to claim 1, wherein the bandwidth size of the first BWP is equal to or greater than a predetermined size.

5. A method of receiving a synchronization signal for a new radio (NR) access technology, the method comprising:
    receiving, by a user equipment (UE), a first synchronization signal through a first bandwidth part (BWP);
    receiving, by the UE, a second synchronization signal through a second bandwidth part (BWP),
    wherein the first BWP and the second BWP are generated from a NR bandwidth; and
    performing, by the UE, time and frequency synchronization using the at least one of a first synchronization signal or the second synchronization signal,
    wherein an additional synchronization signal is received by the UE based on a bandwidth size of the first BWP.

6. The method according to claim 5, wherein the bandwidth of the first BWP and a bandwidth of the second BWP are equal to or greater than that of a block for transmitting the first or second synchronization signals.

7. The method according to claim 5, further comprising:
    receiving, by the UE, configuration information on the first BWP and the second BWP through a radio resource control (RRC) signaling.

8. The method according to claim 5, wherein the bandwidth size of the first BWP is equal to or greater than a predetermined size.

9. A base station configuring a synchronization signal for a new radio (NR) access technology, the base station comprising:
    a controller configured to (i) generate a first bandwidth part (BWP) and a second BWP from a NR bandwidth for a user equipment (UE), (ii) configure a first synchronization signal to be transmitted to the UE in association with the first BWP, and (iii) configure a second synchronization signal in association with the second BWP; and
    a transmitter configured to transmit, to the UE, the configured first synchronization signal through the first BWP, and (ii) transmit, to the UE, the configured second synchronization signal through the second BWP,
    wherein an additional synchronization signal is configured and transmitted to the UE based on a bandwidth size of the first BWP.

10. The base station according to claim 9, wherein the bandwidth of the first BWP and a bandwidth of the second BWP are equal to or greater than that of a block though which the first or second synchronization signals are transmitted.

11. The base station according to claim 9, wherein the controller is further configured to transmit configuration information on the first BWP and the second BWP to the UE through a radio resource control (RRC) signaling.

12. The base station according to claim 9, wherein the bandwidth size of the first BWP is equal to or greater than a predetermined size.

* * * * *